(12) United States Patent
Grichnik et al.

(10) Patent No.: US 8,793,004 B2
(45) Date of Patent: Jul. 29, 2014

(54) VIRTUAL SENSOR SYSTEM AND METHOD FOR GENERATING OUTPUT PARAMETERS

(75) Inventors: Anthony James Grichnik, Eureka, IL (US); Timothy Joe Felty, East Peoria, IL (US); James Robert Mason, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 347 days.

(21) Appl. No.: 13/160,808

(22) Filed: Jun. 15, 2011

(65) Prior Publication Data

US 2012/0323343 A1 Dec. 20, 2012

(51) Int. Cl.
*G05B 13/02* (2006.01)
*G05B 17/02* (2006.01)
*G05B 13/04* (2006.01)

(52) U.S. Cl.
CPC .............. *G05B 17/02* (2013.01); *G05B 13/042* (2013.01); *G05B 13/0265* (2013.01)
USPC ................... 700/30; 700/19; 700/28; 700/47

(58) Field of Classification Search
USPC ............................................................ 703/2
See application file for complete search history.

(56) References Cited

U.S. PATENT DOCUMENTS

| | | | |
|---|---|---|---|
| 3,316,395 A | | 4/1967 | Lavin |
| 3,761,690 A | * | 9/1973 | Sayles et al. ................ 700/46 |
| 4,136,329 A | | 1/1979 | Trobert |
| 4,189,765 A | * | 2/1980 | Kotalik et al. .............. 700/83 |
| 4,533,900 A | | 8/1985 | Muhlberger et al. |
| 4,930,084 A | * | 5/1990 | Hosaka et al. ................ 701/98 |
| 5,014,220 A | | 5/1991 | McMann et al. |
| 5,163,412 A | | 11/1992 | Neu et al. |

(Continued)

FOREIGN PATENT DOCUMENTS

| | | |
|---|---|---|
| EP | 1103926 | 5/2001 |
| EP | 1367248 | 12/2003 |

(Continued)

OTHER PUBLICATIONS

Caroprese, L.; Comito, C.; Talia, D. and Zumpano, E., "Logic Approach to Virtual Sensor Networks", 2010, Proceedings of the 14th International Database Engineering and Applications Symposium, Ideas '10.*

(Continued)

*Primary Examiner* — Mohammad Ali
*Assistant Examiner* — Kelvin Booker
(74) *Attorney, Agent, or Firm* — Finnegan, Henderson, Farabow, Garrett & Dunner, LLP

(57) ABSTRACT

A control system is disclosed. The control system may have a physical sensor configured to measure physical parameter values of a machine. The control system may also have a virtual sensor network system configured to receive the physical parameter values measured by the physical sensor as input parameter values, and generate output parameter values based on the input parameter values. Further, the control system may have an electronic control module configured to store an output parameter value default rate of change and an output parameter value threshold rate of change, compare a rate of change of the output parameter values generated by the virtual sensor network system to the output parameter value threshold rate of change, and control the machine based on the output parameter value default rate of change if the rate of change of the output parameter values exceeds the output parameter value threshold rate of change.

15 Claims, 7 Drawing Sheets

(56) References Cited

U.S. PATENT DOCUMENTS

| | | | |
|---|---|---|---|
| 5,262,941 A | 11/1993 | Saladin et al. | |
| 5,341,315 A | 8/1994 | Niwa et al. | |
| 5,386,373 A | 1/1995 | Keeler et al. | |
| 5,434,796 A | 7/1995 | Weininger | |
| 5,455,773 A * | 10/1995 | Frey | 700/146 |
| 5,467,291 A * | 11/1995 | Fan et al. | 703/14 |
| 5,486,995 A * | 1/1996 | Krist et al. | 700/29 |
| 5,539,638 A | 7/1996 | Keeler et al. | |
| 5,548,528 A | 8/1996 | Keeler et al. | |
| 5,561,610 A | 10/1996 | Schricker et al. | |
| 5,566,091 A | 10/1996 | Schricker et al. | |
| 5,585,553 A | 12/1996 | Schricker | |
| 5,594,637 A | 1/1997 | Eisenberg et al. | |
| 5,598,076 A | 1/1997 | Neubauer et al. | |
| 5,604,306 A | 2/1997 | Schricker | |
| 5,604,895 A | 2/1997 | Raimi | |
| 5,608,865 A | 3/1997 | Midgely et al. | |
| 5,646,869 A * | 7/1997 | Kaneko | 703/2 |
| 5,666,297 A | 9/1997 | Britt et al. | |
| 5,682,317 A | 10/1997 | Keeler et al. | |
| 5,698,780 A | 12/1997 | Mizutani et al. | |
| 5,727,128 A | 3/1998 | Morrison | |
| 5,750,887 A | 5/1998 | Schricker | |
| 5,752,007 A | 5/1998 | Morrison | |
| 5,835,902 A | 11/1998 | Jannarone | |
| 5,842,202 A | 11/1998 | Kon | |
| 5,864,773 A | 1/1999 | Barna et al. | |
| 5,914,890 A | 6/1999 | Sarangapani et al. | |
| 5,925,089 A | 7/1999 | Fujime | |
| 5,930,762 A * | 7/1999 | Masch | 705/7.28 |
| 5,950,147 A | 9/1999 | Sarangapani et al. | |
| 5,966,312 A | 10/1999 | Chen | |
| 5,970,426 A | 10/1999 | Mandel et al. | |
| 5,987,976 A | 11/1999 | Sarangapani | |
| 6,086,617 A | 7/2000 | Waldon et al. | |
| 6,092,016 A | 7/2000 | Sarangapani et al. | |
| 6,119,074 A | 9/2000 | Sarangapani | |
| 6,145,066 A | 11/2000 | Atkin | |
| 6,195,648 B1 | 2/2001 | Simon et al. | |
| 6,199,007 B1 | 3/2001 | Zavarehi et al. | |
| 6,207,937 B1 * | 3/2001 | Stoddard et al. | 219/497 |
| 6,208,982 B1 | 3/2001 | Allen, Jr. et al. | |
| 6,211,495 B1 * | 4/2001 | Stoddard et al. | 219/497 |
| 6,222,164 B1 * | 4/2001 | Stoddard et al. | 219/497 |
| 6,223,133 B1 | 4/2001 | Brown | |
| 6,236,908 B1 | 5/2001 | Cheng et al. | |
| 6,240,343 B1 | 5/2001 | Sarangapani et al. | |
| 6,269,351 B1 | 7/2001 | Black | |
| 6,298,718 B1 | 10/2001 | Wang | |
| 6,370,544 B1 | 4/2002 | Krebs et al. | |
| 6,405,122 B1 | 6/2002 | Yamaguchi | |
| 6,438,430 B1 | 8/2002 | Martin et al. | |
| 6,441,350 B1 * | 8/2002 | Stoddard et al. | 219/497 |
| 6,442,511 B1 | 8/2002 | Sarangapani et al. | |
| 6,477,660 B1 | 11/2002 | Sohner | |
| 6,513,018 B1 | 1/2003 | Culhane | |
| 6,546,379 B1 | 4/2003 | Hong et al. | |
| 6,556,939 B1 * | 4/2003 | Wegerich | 702/127 |
| 6,584,768 B1 | 7/2003 | Hecker et al. | |
| 6,594,989 B1 | 7/2003 | Hepburn et al. | |
| 6,698,203 B2 | 3/2004 | Wang | |
| 6,711,676 B1 | 3/2004 | Zomaya et al. | |
| 6,721,606 B1 | 4/2004 | Kaji et al. | |
| 6,725,208 B1 | 4/2004 | Hartman et al. | |
| 6,760,716 B1 | 7/2004 | Ganesamoorthi et al. | |
| 6,763,708 B2 | 7/2004 | Ting et al. | |
| 6,775,647 B1 | 8/2004 | Evans et al. | |
| 6,785,604 B2 | 8/2004 | Jacobson | |
| 6,810,442 B1 | 10/2004 | Lin et al. | |
| 6,823,675 B2 | 11/2004 | Brunell et al. | |
| 6,853,920 B2 | 2/2005 | Hsiung et al. | |
| 6,859,770 B2 | 2/2005 | Ramsey | |
| 6,859,785 B2 | 2/2005 | Case | |
| 6,865,883 B2 | 3/2005 | Gomulka | |
| 6,876,943 B2 * | 4/2005 | Wegerich | 702/127 |
| 6,879,927 B1 * | 4/2005 | Lu | 702/123 |
| 6,882,929 B2 | 4/2005 | Liang et al. | |
| 6,895,286 B2 | 5/2005 | Kaji et al. | |
| 6,935,313 B2 | 8/2005 | Jacobson | |
| 6,941,287 B1 | 9/2005 | Vaidyanathan et al. | |
| 6,952,662 B2 | 10/2005 | Wegerich et al. | |
| 6,976,062 B1 | 12/2005 | Denby et al. | |
| 6,985,779 B2 * | 1/2006 | Hsiung et al. | 700/19 |
| 6,988,093 B2 | 1/2006 | Pic et al. | |
| 7,000,229 B2 | 2/2006 | Gere | |
| 7,024,343 B2 | 4/2006 | El-Ratal | |
| 7,027,953 B2 | 4/2006 | Klein | |
| 7,031,778 B2 * | 4/2006 | Hsiung et al. | 700/29 |
| 7,035,740 B2 | 4/2006 | Kermani | |
| 7,035,834 B2 | 4/2006 | Jacobson | |
| 7,117,079 B2 | 10/2006 | Streichsbier et al. | |
| 7,124,047 B2 | 10/2006 | Zhang et al. | |
| 7,127,892 B2 | 10/2006 | Akins et al. | |
| 7,174,284 B2 | 2/2007 | Dolansky et al. | |
| 7,178,328 B2 | 2/2007 | Solbrig | |
| 7,191,161 B1 | 3/2007 | Rai et al. | |
| 7,194,392 B2 | 3/2007 | Tuken et al. | |
| 7,213,007 B2 | 5/2007 | Grichnik | |
| 7,284,043 B2 | 10/2007 | Feinleib et al. | |
| 7,302,363 B2 | 11/2007 | Kaushal et al. | |
| 7,313,447 B2 * | 12/2007 | Hsiung et al. | 700/9 |
| 7,356,393 B1 | 4/2008 | Schlatre et al. | |
| 7,369,925 B2 | 5/2008 | Morioka et al. | |
| 7,440,839 B2 | 10/2008 | Cesario et al. | |
| 7,499,842 B2 | 3/2009 | Grichnik et al. | |
| 7,505,844 B2 | 3/2009 | Wiseman et al. | |
| 7,505,949 B2 | 3/2009 | Grichnik | |
| 7,532,988 B2 | 5/2009 | Khibnik et al. | |
| 7,542,600 B2 | 6/2009 | Yu et al. | |
| 7,542,879 B2 | 6/2009 | Grichnik et al. | |
| 7,565,333 B2 | 7/2009 | Grichnik et al. | |
| 7,593,804 B2 | 9/2009 | Grichnik et al. | |
| 7,693,608 B2 | 4/2010 | Nasle | |
| 7,693,683 B2 | 4/2010 | Ihara | |
| 7,698,074 B1 | 4/2010 | Cybulski | |
| 7,698,109 B2 * | 4/2010 | Binzer et al. | 703/1 |
| 7,787,969 B2 | 8/2010 | Grichnik et al. | |
| 7,813,869 B2 | 10/2010 | Grichnik et al. | |
| 7,912,561 B2 * | 3/2011 | Hsiung et al. | 700/28 |
| 8,091,416 B2 * | 1/2012 | Wang et al. | 73/114.75 |
| 8,185,483 B2 * | 5/2012 | Buendia et al. | 706/14 |
| 8,214,188 B2 * | 7/2012 | Bailey et al. | 703/10 |
| 8,321,194 B2 * | 11/2012 | Meagher et al. | 703/14 |
| 8,352,049 B2 * | 1/2013 | Hsiung et al. | 700/47 |
| 8,594,828 B2 * | 11/2013 | Stephenson et al. | 700/127 |
| 2002/0014294 A1 | 2/2002 | Okano et al. | |
| 2002/0016701 A1 | 2/2002 | Duret et al. | |
| 2002/0042784 A1 | 4/2002 | Kerven et al. | |
| 2002/0049704 A1 | 4/2002 | Vanderveldt et al. | |
| 2002/0103996 A1 | 8/2002 | LeVasseur et al. | |
| 2002/0146178 A1 | 10/2002 | Bolle et al. | |
| 2002/0198821 A1 | 12/2002 | Munoz | |
| 2003/0018503 A1 | 1/2003 | Shulman | |
| 2003/0055607 A1 | 3/2003 | Wegerich et al. | |
| 2003/0083756 A1 * | 5/2003 | Hsiung et al. | 700/28 |
| 2003/0093250 A1 | 5/2003 | Goebel | |
| 2003/0109951 A1 * | 6/2003 | Hsiung et al. | 700/108 |
| 2003/0126053 A1 | 7/2003 | Boswell et al. | |
| 2003/0126103 A1 | 7/2003 | Chen et al. | |
| 2003/0130855 A1 | 7/2003 | Babu et al. | |
| 2003/0144746 A1 * | 7/2003 | Hsiung et al. | 700/28 |
| 2003/0158694 A1 * | 8/2003 | Wegerich | 702/127 |
| 2003/0167354 A1 | 9/2003 | Peppers et al. | |
| 2003/0187567 A1 | 10/2003 | Sulatisky et al. | |
| 2003/0187584 A1 | 10/2003 | Harris | |
| 2003/0200296 A1 | 10/2003 | Lindsey | |
| 2004/0022441 A1 | 2/2004 | Cecala et al. | |
| 2004/0030420 A1 | 2/2004 | Ulyanov et al. | |
| 2004/0034857 A1 | 2/2004 | Mangino et al. | |
| 2004/0059518 A1 | 3/2004 | Rothschild | |
| 2004/0077966 A1 | 4/2004 | Yamaguchi et al. | |
| 2004/0122702 A1 | 6/2004 | Sabol et al. | |
| 2004/0122703 A1 | 6/2004 | Walker et al. | |
| 2004/0128058 A1 | 7/2004 | Andres et al. | |

(56) References Cited

U.S. PATENT DOCUMENTS

| | | |
|---|---|---|
| 2004/0135677 A1 | 7/2004 | Asam |
| 2004/0138995 A1 | 7/2004 | Hershkowitz et al. |
| 2004/0153227 A1 | 8/2004 | Hagiwara et al. |
| 2004/0230404 A1 | 11/2004 | Messmer et al. |
| 2004/0267818 A1 | 12/2004 | Hartenstine |
| 2005/0047661 A1 | 3/2005 | Maurer |
| 2005/0055176 A1 | 3/2005 | Clarke et al. |
| 2005/0091093 A1 | 4/2005 | Bhaskaran et al. |
| 2005/0209829 A1* | 9/2005 | Binzer et al. ............... 703/1 |
| 2005/0209943 A1 | 9/2005 | Ballow et al. |
| 2005/0210337 A1 | 9/2005 | Chester et al. |
| 2005/0240539 A1 | 10/2005 | Olavson |
| 2005/0261791 A1 | 11/2005 | Chen et al. |
| 2005/0262031 A1 | 11/2005 | Saidi et al. |
| 2005/0278227 A1 | 12/2005 | Esary et al. |
| 2005/0278432 A1 | 12/2005 | Feinleib et al. |
| 2006/0010057 A1 | 1/2006 | Bradway et al. |
| 2006/0010142 A1 | 1/2006 | Kim et al. |
| 2006/0010157 A1 | 1/2006 | Dumitrascu et al. |
| 2006/0025897 A1 | 2/2006 | Shostak et al. |
| 2006/0026270 A1 | 2/2006 | Sadovsky et al. |
| 2006/0026587 A1 | 2/2006 | Lemarroy et al. |
| 2006/0064474 A1 | 3/2006 | Feinleib et al. |
| 2006/0068973 A1 | 3/2006 | Kappauf et al. |
| 2006/0129289 A1 | 6/2006 | Kumar et al. |
| 2006/0130052 A1 | 6/2006 | Allen et al. |
| 2006/0210168 A1 | 9/2006 | Kim et al. |
| 2006/0229753 A1 | 10/2006 | Seskin et al. |
| 2006/0229769 A1 | 10/2006 | Grichnik et al. |
| 2006/0229852 A1 | 10/2006 | Grichnik et al. |
| 2006/0229854 A1 | 10/2006 | Grichnik et al. |
| 2006/0230018 A1 | 10/2006 | Grichnik et al. |
| 2006/0230097 A1 | 10/2006 | Grichnik et al. |
| 2006/0230313 A1 | 10/2006 | Grichnik et al. |
| 2006/0241923 A1 | 10/2006 | Xu et al. |
| 2006/0245631 A1 | 11/2006 | Levenson et al. |
| 2006/0247798 A1 | 11/2006 | Subbu et al. |
| 2006/0259163 A1* | 11/2006 | Hsiung et al. ............... 700/30 |
| 2007/0061144 A1 | 3/2007 | Grichnik et al. |
| 2007/0094048 A1 | 4/2007 | Grichnik |
| 2007/0094181 A1 | 4/2007 | Tayebnejad et al. |
| 2007/0118338 A1 | 5/2007 | Grichnik et al. |
| 2007/0124237 A1 | 5/2007 | Sundararajan et al. |
| 2007/0150332 A1 | 6/2007 | Grichnik et al. |
| 2007/0168494 A1 | 7/2007 | Liu et al. |
| 2007/0179769 A1 | 8/2007 | Grichnik et al. |
| 2007/0203864 A1 | 8/2007 | Grichnik |
| 2007/0260433 A1* | 11/2007 | Seki .......................... 703/2 |
| 2008/0103751 A1* | 5/2008 | Hsiung et al. ............... 703/20 |
| 2008/0154811 A1 | 6/2008 | Grichnik et al. |
| 2008/0201054 A1 | 8/2008 | Grichnik et al. |
| 2008/0208544 A1* | 8/2008 | Buendia et al. ............... 703/2 |
| 2008/0243354 A1 | 10/2008 | Grichnik et al. |
| 2008/0243401 A1 | 10/2008 | Viele |
| 2008/0255819 A1 | 10/2008 | Gross et al. |
| 2009/0063087 A1* | 3/2009 | Grichnik et al. ............ 702/127 |
| 2009/0118841 A1 | 5/2009 | Grichnik et al. |
| 2009/0119065 A1 | 5/2009 | Grichnik et al. |
| 2010/0010684 A1* | 1/2010 | Lorenz et al. ............... 700/293 |
| 2010/0049335 A1* | 2/2010 | Assarsson et al. ............ 700/9 |
| 2010/0050025 A1 | 2/2010 | Grichnik et al. |
| 2011/0082596 A1* | 4/2011 | Meagher et al. ............ 700/291 |
| 2011/0082597 A1* | 4/2011 | Meagher ..................... 700/291 |
| 2011/0214878 A1* | 9/2011 | Bailey et al. ............... 166/369 |
| 2012/0041574 A1* | 2/2012 | Hsiung et al. ............... 700/47 |
| 2012/0158383 A1* | 6/2012 | Rochoux ..................... 703/2 |
| 2012/0290276 A1* | 11/2012 | Schulz et al. ............... 703/2 |
| 2013/0006408 A1* | 1/2013 | Zakrzwski et al. ........... 700/107 |

FOREIGN PATENT DOCUMENTS

| | | |
|---|---|---|
| EP | 1418481 | 5/2004 |
| JP | 10-332621 | 12/1998 |
| JP | 11-351045 | 12/1999 |
| JP | 2002-276344 | 9/2002 |
| WO | WO 97/42581 | 11/1997 |
| WO | WO 02/057856 | 7/2002 |
| WO | WO 2006/017453 | 2/2006 |
| WO | WO 2007/058695 | 5/2007 |

OTHER PUBLICATIONS

Dorst, L.; Groen, F.C.A.; Van Den Akker, J.M.; Breeman, J.; Hoekstra, A.; Lagerberg, J.; Visser, A.; Yakali, H. and Hertzberger, L.O., "The Virtual Sensor Concept Applied to Simulation: The Evaluation of Automatic Debiting System", May 1997, 1997 Workshop on Emergent Technologies and Virtual Systems for Instrumentation and Measurements.*

Gupta, A.; Gui, C. and Mohapatra, P., "Exploiting Multi-Channel Clustering for Power Efficiency in Sensor Networks", 2006, First International Conference on Communication System Software and Middleware.*

Kabadayi, S. and Julien, C., "Remotely Deployed Virtual Sensors", 2007, The University of Texas at Austin.*

Kabadayi, S., "Middleware for On-Demand Access to Sensor Networks", 2006, The University of Texas at Austin.*

Allen et al., "Supersaturated Designs That Maximize the Probability of Identifying Active Factors," *2003 American Statistical Association and the American Society for Quality, Technometrics*, vol. 45, No. 1, Feb. 2003, pp. 1-8.

April et al., "Practical Introduction to Simulation Optimization," *Proceedings of the 2003 Winter Simulation Conference*, pp. 71-78.

Bandte et al., "Viable Designs Through a Joint Probabilistic Estimation Technique," *SAE International, and the American Institute of Aeronautics and Astronautics, Inc.*, Paper No. 1999-01-5623, 1999, pp. 1-11.

Beisl et al., "Use of Genetic Algorithm to Identify the Source Point of Seepage Slick Clusters Interpreted from Radarsat-1 Images in the Gulf of Mexico," *Geoscience and Remote Sensing Symposium, 2004 IEEE International*, Anchorage, Alaska, vol. 6, Sep. 20-24, 2004, pp. 4139-4142.

Berke et al., "Optimum Design of Aerospace Structural Components Using Neural Networks," *Computers and Structures*, vol. 48, No. 6, Sep. 17, 1993, pp. 1001-1010, XP-002402393.

Bezdek et al., "Genetic Algorithm Guided Clustering," *IEEE* 0-7803-1899-4/94, 1994, pp. 34-39.

Brahma et al., "Optimization of Diesel Engine Operating Parameters Using Neural Networks," *SAE International*, SAE Technical Paper Series, 2003-01-3228, Oct. 27-30, 2003, 11 pages.

Chau et al., "Use of Runs Test to Access Cardiovascular Autonomic Function in Diabetic Subjects," *Diabetes Care*, vol. 17, No. 2, Feb. 1994, pp. 146-148, available at http://care.diabetesjournals.org/cgi/content/abstract/17/2/146).

Chung et al., "Process Optimal Design in Forging by Genetic Algorithm," *Journal of Manufacturing Science and Engineering*, vol. 124, May 2002, pp. 397-408.

Cox et al., "Statistical Modeling for Efficient Parametric Yield Estimation of MOS VLSI Circuits," *IEEE*, 1983, pp. 242-245.

De Maesschalck et al., "The Mahalanobis Distance," *Chemometrics and Intelligent Laboratory Systems*, vol. 50, Jan. 2000, pp. 1-18.

De Santos et al., "Virtual Sensors for Walking Robots," Textbook, 2006, pp. 191-211.

Dikmen et al., "Estimating Distributions in Genetic Algorithms," *ISCIS*, LNCS 2869, 2003, pp. 521-528.

Galperin et al., "Parallel Monte-Carlo Simulation of Neural Network Controllers," available at http://www-fp.mcs.anl.gov/ccst/research/reports_pre1998/neural_network/galperin.html, printed Mar. 11, 2005, 6 pages.

Ghysels et al., "Testing for Structural Change in the Presence of Auxiliary Models," *Cirano*, Scientific Series, Montreal, Canada, Sep. 2001, pp. 1-41.

Gletsos et al., "A Computer-Aided Diagnostic System to Characterize CT Focal Liver Lesions: Design and Optimization of a Neural Network Classifier," *IEEE Transactions on Information Technology in Biomedicine*, vol. 7, No. 3, Sep. 2003, pp. 153-162.

(56) References Cited

OTHER PUBLICATIONS

Grichnik et al., "An Improved Metric for Robust Engineering," *Proceedings of the 2007 International Conference on Scientific Computing*, Las Vegas, Nevada, 4 pages.
Holland, "Genetic Algorithms," *Scientific American*, Jul. 1992, pp. 66-72.
Hughes et al., "Linear Statistics for Zeros of Riemann's Zeta Function," *C.R. Academy of Science Paris*, Ser. I 335, 2002, pp. 667-670.
Ko et al., "Application of Artificial Neural Network and Taguchi Method to Perform Design in Metal Forming Considering Workability," *International Journal of Machine Tools & Manufacture*, vol. 39, No. 5, May 1999, pp. 771-785, XP-002402391.
Kroha et al., "Object Server on a Parallel Computer," *IEEE* 0-8186-8147-0/97, 1997, pp. 284-288.
Liu et al., "Specification Tests in the Efficient Method of Moments Framework with Application to the Stochastic Volatility Models," *Carnegie Mellon University*, Nov. 1996, 31 pages.
Mavris et al., "A Probabilistic Approach to Multivariate Constrained Robust Design Simulation," *Society of Automotive Engineers, Inc.*, Paper No. 975508, 1997, pp. 1-11.
*National Institute of Health*, "Risk Assessment Tool for Estimating 10-Year Risk of Developing Hard CHD (Myocardial Infarction and Coronary Death)" available at http://hin.nhlbi.nih.gov/atpiii/calculator.asp?usertype=prof, printed Aug. 5, 2005, 2 pages.
Obayashi et al, "Multiobjective Evolutionary Computation for Supersonic Wing-Shape Optimization," *IEEE Transactions on Evolutionary Computation*, vol. 4, No. 2, Jul. 2000, pp. 182-187.
Oberstar, "Fixed-Point Representation & Fractional Math," *Oberstar Consulting*, Aug. 30, 2007, pp. 1-18.
Simpson et al., "Metamodels for Computer-Based Engineering Design: Survey and Recommendations," *Engineering with Computers*, vol. 17, 2001, pp. 129-150, XP-002402392.
Solar Turbines: Customer Support>InSight System webpage, *Solar Turbines, Inc.*, available at http://mysolar.cat.com/cda/layout?m=68420&x=7, San Diego, California, printed Oct. 19, 2006, 2 pages.
Solar Turbines, InSight System, Machinery Management Solutions webpage, *Solar Turbines, Inc.*, San Diego, California, 6 pages., 2008.
Song et al., "The Hyperellipsoidal Clustering Using Genetic Algorithm," *IEEE International Conference on Intelligent Processing Systems*, Oct. 28-31, 1997, Beijing, China, pp. 592-596.
Sytsma, "Quality and Statistical Process Control," *Processes and Process Variability, Ferris State University*, available at http://www.sytsma.com/tqmtools/ctlchtprinciples.html, printed Apr. 7, 2005, 6 pages.
Taguchi et al., "The Mahalanobis-Taguchi Strategy," A Pattern Technology System, *John Wiley & Sons, Inc.*, 2002, 234 pages.
Taylor et al., "Guidelines for Evaluating and Expressing the Uncertainty of NIST Measurement Results," *U.S. Department of Commerce, National Institute of Standards and Technology*, NIST Technical Note 1297, 1994 Edition, 25 pages.
Thompson et al., "Neural Network Modelling of the Emissions and Performance of a Heavy-Duty Diesel Engine," *Proc. Instu. Mechanical Engineers*, vol. 214, Part D, 2000, pp. 111-126.
Tilak et al., "Dynamic Resource Discovery for Sensor Networks," *International Federation for Information Processing*, 2005, pp. 785-796.
Traver et al., "A Neural Network-Based Virtual NOx Sensor for Diesel Engines," *West Virginia University, Mechanical and Aerospace Engineering Department*, Morgantown, West Virginia, 7 pages.
Traver et al., "Neural Network-Based Diesel Engine Emissions Prediction Using In-Cylinder Combustion Pressure," *International Spring Fuels & Lubricants Meeting & Exposition, SAE Technical Paper Series*, 1999-01-1532, Dearborn, Michigan, May 3-6, 1999, 17 pages.
Woodall et al., "A Review and Analysis of the Mahalanobis-Taguchi System," Technometrics, Feb. 2003, vol. 45, No. 1, pp. 1-15.
Wu et al., "Cam-Phasing Optimization Using Artificial Neural Networks as Surrogate Models—Fuel Consumption and NOx Emissions," *SAE Technical Paper Series*, 2006-01-1512, Apr. 3-6, 2006, 19 pages.
Yang et al., "Similar Cases Retrieval from the Database of Laboratory Test Results," *Journal of Medical Systems*, vol. 27, No. 3, Jun. 2003, pp. 271-282, XP-002330704.
Yuan et al., "Evolutionary Fuzzy C-Means Clustering Algorithm," *IEEE* 0-7803-2461-7/95, 1995, pp. 2221-2226.
Office Action issued in U.S. Appl. No. 11/642,913, on Apr. 30, 2010, 28 pages.
Office Action issued in U.S. Appl. No. 11/642,913, on Sep. 16, 2010, 16 pages.
Office Action issued in U.S. Appl. No. 12/222,957, on Apr. 28, 2010, 18 pages.
International Search Report, dated Oct. 1, 2008, for International Application No. PCT/US2008/007413, filed Jun. 13, 2008.

* cited by examiner

VIRTUAL SENSOR SYSTEM AND METHOD FOR GENERATING OUTPUT PARAMETERS

TECHNICAL FIELD

This disclosure relates generally to virtual sensor techniques and, more particularly, to virtual sensor control systems and methods.

BACKGROUND

Physical sensors are used in many modern machines to measure and monitor physical phenomena, such as temperature, speed, and fluid flow constituents. Physical sensors often take direct measurements of the physical phenomena and convert these measurements into measurement data to be further processed by control systems. Although physical sensors take direct measurements of the physical phenomena, physical sensors and associated hardware are often costly and, sometimes, unreliable. Further, when control systems rely on physical sensors to operate properly, a failure of a physical sensor may render such control systems inoperable. For example, the failure of an intake manifold pressure sensor in an engine may result in shutdown of the engine entirely, even if the engine itself is still operable.

Instead of direct measurements, virtual sensors are developed to process other physically measured values and to produce values that were previously measured directly by physical sensors. For example, U.S. Pat. No. 5,386,373 (the '373 patent) issued to Keeler et al. on Jan. 31, 1995, discloses a virtual continuous emission monitoring system with sensor validation. The '373 patent uses a back propagation-to-activation model and a monte-carlo search technique to establish and optimize a computational model used for the virtual sensing system to derive sensing parameters from other measured parameters.

The techniques disclosed in the '373 patent may not account for certain physical limitations of the sensor environment and/or the physical sensor it is replacing, and thus may provide inaccurate values. For example, the rate of change of a machine's parameter values may be limited by the machine's physical characteristics, e.g., the rate of change in the speed of a motor may be limited by physical constraints such as weight, inertia, friction, etc. Thus, the speed of the motor is unlikely to be able to change from 0 revolutions per minute (rpm) to 3000 rpm in 0.1 seconds. However, a virtual sensor that is unconstrained and bases its output parameter values on other input values may generate output parameter values that indicate the occurrence of such an implausible scenario. Thus, it may be desirable to control the output parameter values of the virtual sensors in such a way as to ensure that a rate of change of the output parameter values is feasible based on the physical characteristics of the machine and/or the physical sensor that is being modeled by the virtual sensor.

The disclosed methods and systems are directed to solving one or more of the problems set forth above and/or other problems of the prior art.

SUMMARY

In one aspect, the present disclosure is directed to a virtual sensor network system. The virtual sensor network system may include a memory that is configured to store a virtual sensor model, an output parameter value default rate of change, and an output parameter value threshold rate of change. The virtual sensor network system may also include a processor that is configured to receive, as input parameter values, physical parameter values of a machine measured from a physical sensor, and generate output parameter values based on the input parameter values and the virtual sensor model. The processor may also be configured to make a comparison between a rate of change of the output parameter values to the output parameter value threshold rate of change, and generate a default output parameter value based on the comparison.

In another aspect, the present disclosure is directed to a computer-implemented virtual sensor control method. The method may include receiving, as input parameter values, physical parameter values of a machine measured from a physical sensor, and generating output parameter values based on the input parameter values and a virtual sensor model. The method may also include controlling the machine based on a comparison of a rate of change of the output parameter values to an output parameter value threshold rate of change.

In yet another aspect, the present disclosure is directed to a control system. The control system may include a physical sensor configured to measure physical parameter values of a machine at a plurality of times. The control system may also include a virtual sensor network system configured to receive the physical parameter values measured by the physical sensor as input parameter values, and generate output parameter values based on the input parameter values. Further, the control system may include an electronic control module configured to store an output parameter value default rate of change and an output parameter value threshold rate of change, compare a rate of change of the output parameter values generated by the virtual sensor network system to the output parameter value threshold rate of change, and control the machine based on the output parameter value default rate of change if the rate of change of the output parameter values exceeds the output parameter value threshold rate of change.

DETAILED DESCRIPTION

Figure 1:
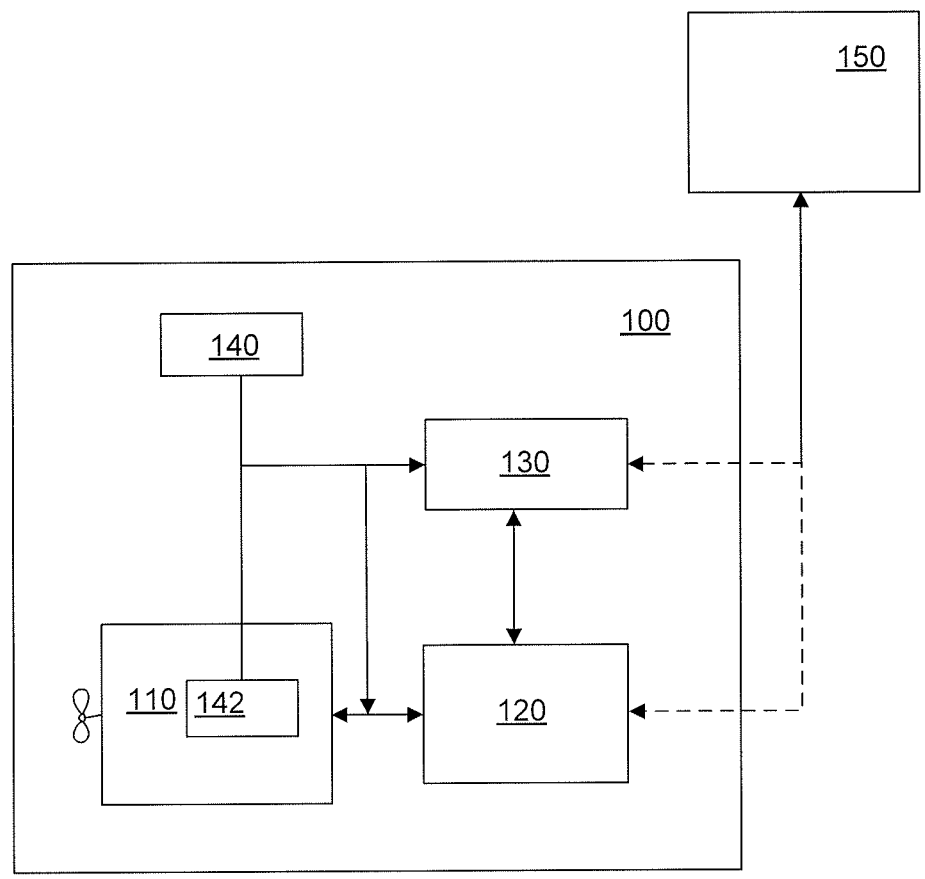
FIG. 1 is a diagrammatic illustration of an exemplary disclosed machine.

FIG. 1 illustrates an exemplary machine 100 in which features and principles consistent with certain disclosed embodiments may be incorporated. Machine 100 may refer to any type of stationary or mobile machine that performs some type of operation associated with a particular industry, e.g., construction, transportation, etc. Machine 100 may also include any type of commercial vehicle such as cars, vans, and other vehicles. Other types of machines may also be included.

As shown in FIG. 1, machine 100 may include an engine 110, an electronic control module (ECM) 120, a virtual sensor network system 130, and physical sensors 140 and 142. Engine 110 may include any appropriate type of engine or power source that generates power for machine 100, such as an internal combustion engine or fuel cell generator. ECM 120 may include any appropriate type of engine control system configured to perform engine control functions such that engine 110 may operate properly. ECM 120 may include any number of devices, such as microprocessors or microcontrollers, application-specific integrated circuits (ASICs), field programmable gate arrays (FPGAs), memory modules, communication devices, input/output devices, storages devices, etc., to perform such control functions. Further, computer software instructions may be stored in or loaded to ECM 120. ECM 120 may execute the computer software instructions to perform various control functions and processes.

Although ECM 120 is shown to control engine 110, ECM 120 may also control other systems of machine 100, such as transmission systems and/or hydraulics systems. Multiple ECMs may be included in ECM 120 or may be used on machine 100. For example, a plurality of ECMs may be used to control different systems of machine 100 and also to coordinate operations of these systems. Further, the plurality of ECMs may be coupled together via a communication network to exchange information. Information such as input parameters, output parameters, parameter values, status of control systems, physical and virtual sensors, and virtual sensor networks may be communicated to the plurality of ECMs simultaneously.

Physical sensor 140 may include one or more sensors provided for measuring certain parameters related to machine 100 and providing corresponding parameter values. For example, physical sensor 140 may include physical emission sensors for measuring emissions of machine 100, such as Nitrogen Oxides ($NO_x$), Sulfur Dioxide ($SO_2$), Carbon Monoxide (CO), total reduced Sulfur (TRS), etc. In particular, $NO_x$ emission sensing and reduction may be important to normal operation of engine 110. Physical sensor 142 may include any appropriate sensors that are used with engine 110 or other machine components (not shown) to provide various measured parameter values about engine 110 or other components, such as temperature, speed, acceleration rate, fuel pressure, power output, etc.

Virtual sensor network system 130 may be coupled with physical sensors 140 and 142 and ECM 120 to provide control functionalities based on integrated virtual sensors. A virtual sensor, as used herein, may refer to a mathematical algorithm or model that generates and outputs parameter values comparable to a physical sensor based on inputs from other systems, such as physical sensors 140 and 142. For example, a physical $NO_x$ emission sensor may measure the $NO_x$ emission level of machine 100 and provide parameter values of the $NO_x$ emission level to other components, such as ECM 120. A virtual $NO_x$ emission sensor may provide calculated parameter values of the $NO_x$ emission level to ECM 120 based on other measured or calculated parameters, such as compression ratios, turbocharger efficiencies, aftercooler characteristics, temperature values, pressure values, ambient conditions, fuel rates, engine speeds, etc. The term "virtual sensor" may be used interchangeably with "virtual sensor model."

A virtual sensor network, as used herein, may refer to one or more virtual sensors integrated and working together to generate and output parameter values. For example, virtual sensor network system 130 may include a plurality of virtual sensors configured or established according to certain criteria based on a particular application. Virtual sensor network system 130 may also facilitate or control operations of the plurality of virtual sensors. The plurality of virtual sensors may include any appropriate virtual sensor providing output parameter values corresponding to one or more physical sensors in machine 100.

Further, virtual sensor network system 130 may be configured as a separate control system or, alternatively, may coincide with other control systems such as ECM 120. Virtual sensor network system 130 may also operate in series with or in parallel with ECM 120.

A server computer 150 may be coupled to machine 100, either onboard machine 100 or at an offline location. Server computer 150 may include any appropriate computer system configured to create, train, and validate virtual sensor models and/or virtual sensor network models. Server computer 150 may also deploy the virtual sensor models and/or the virtual sensor network models to virtual sensor network system 130 and/or ECM 120 if virtual sensor network system 130 coincides with ECM 120. Further, server computer 150 may communicate with virtual sensor network system 130 and/or ECM 120 to exchange operational and configuration data, such as information that may be used to monitor and constrain the rates of change of one or more parameter values. Server computer 150 may communicate with virtual sensor network system 130 and/or ECM 120 via any appropriate communication means, such as a computer network or a wireless telecommunication link.

Figure 2:
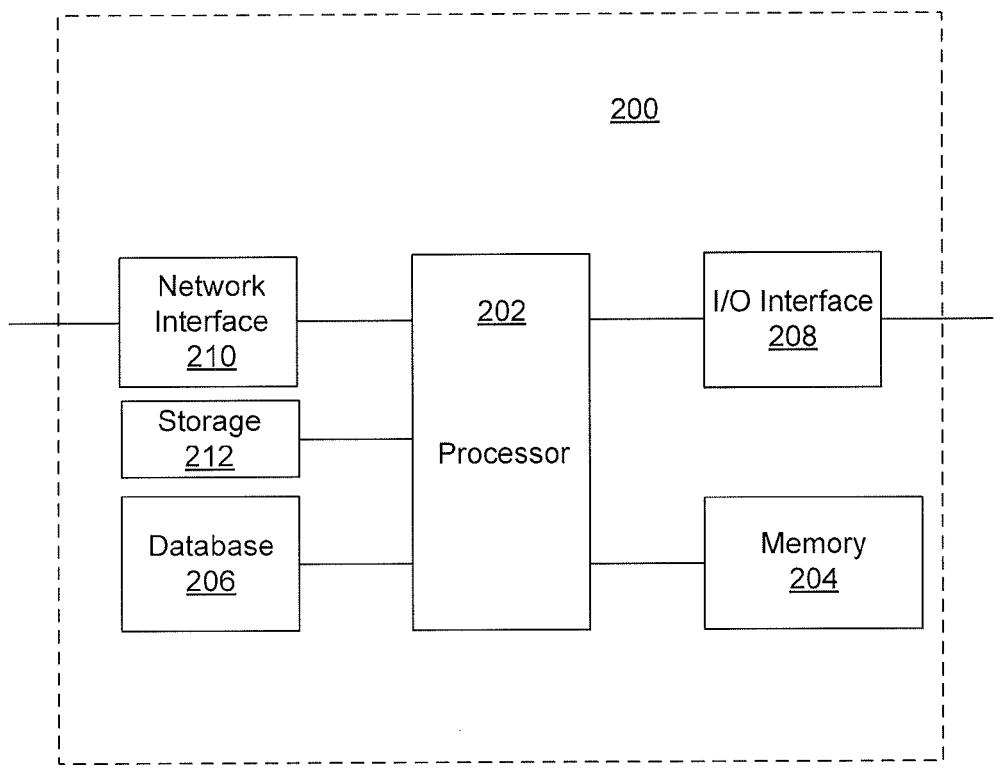
FIG. 2 is a block diagram of a exemplary computer system that may be incorporated into the machine of FIG. 1.

Virtual sensor network system 130 and/or ECM 120 may be implemented by any appropriate computer system. FIG. 2 shows an exemplary functional block diagram of a computer system 200 configured to implement virtual sensor network system 130 and/or ECM 120. Computer system 200 may also include server computer 150 configured to design, train, and validate virtual sensors in virtual sensor network system 130 and other components of machine 100.

As shown in FIG. 2, computer system 200 (e.g., virtual sensor network system 130, ECM 120, etc.) may include a processor 202, a memory 204, a database 206, an I/O interface 208, a network interface 210, and a storage 212. Other components, however, may also be included in computer system 200.

Processor 202 may include any appropriate type of general purpose microprocessor, digital signal processor, or microcontroller. Memory 204 may include one or more memory devices including, but not limited to, a ROM, a flash memory, a dynamic RAM, and a static RAM. Memory 204 may be configured to store information used by processor 202. Database 206 may include any type of appropriate database containing information related to virtual sensor networks, such as characteristics of measured parameters, sensing parameters, mathematical models, and/or any other control information. Storage 212 may include any appropriate type of storage provided to store any type of information that processor 202 may need to operate. For example, storage 212 may include one or more hard disk devices, optical disk devices, or other storage devices to provide storage space.

Memory 204, database 206, and/or storage 212 may also store information regarding virtual sensor network control functions, such as input parameter value default rates of change, input parameter value threshold rates of change, output parameter value default rates of change, and output parameter value threshold rates of change, for various physical sensors and environments (e.g., different engine types, operating conditions, etc.). The default and threshold rates of change are discussed in greater detail below.

Moreover, memory 204, database 206, and/or storage 212 may store information and/or computer programs used by processor 202 to enable processor 202 to perform functions consistent with disclosed embodiments, e.g., the processes described with regard to FIGS. 4-6, discussed in greater detail below. For example, if computer system 200 is used to implement virtual sensor network system 130, memory 204, database 206, and/or storage 212 may include information and/or computer programs that enable processor 202 to monitor and constrain the rate of change of input parameter values it receives and/or output parameter values it generates. Similarly, if computer system 200 is used to implement ECM 120, memory 204, database 206 and/or storage 212 may include information and/or computer programs that enable processor 202 to monitor and constrain the rate of change of input parameter values that are sent to virtual sensor network system 130 and monitor and constrain the rate of change of output parameter values that are received from virtual sensor network system 130, to ensure that ECM 120 controls engine 110 based on the proper parameters.

I/O interface 208 may be configured to obtain data from input/output devices, such as various sensors or other components (e.g., physical sensors 140 and 142) and/or to transmit data to these components. Network interface 210 may include any appropriate type of network device capable of communicating with other computer systems based on one or more wired or wireless communication protocols. Any or all of the components of computer system 200 may be implemented or integrated into an application-specific integrated circuit (ASIC) or field programmable gate array (FPGA) device, or other integrated circuit devices.

Figure 3A:
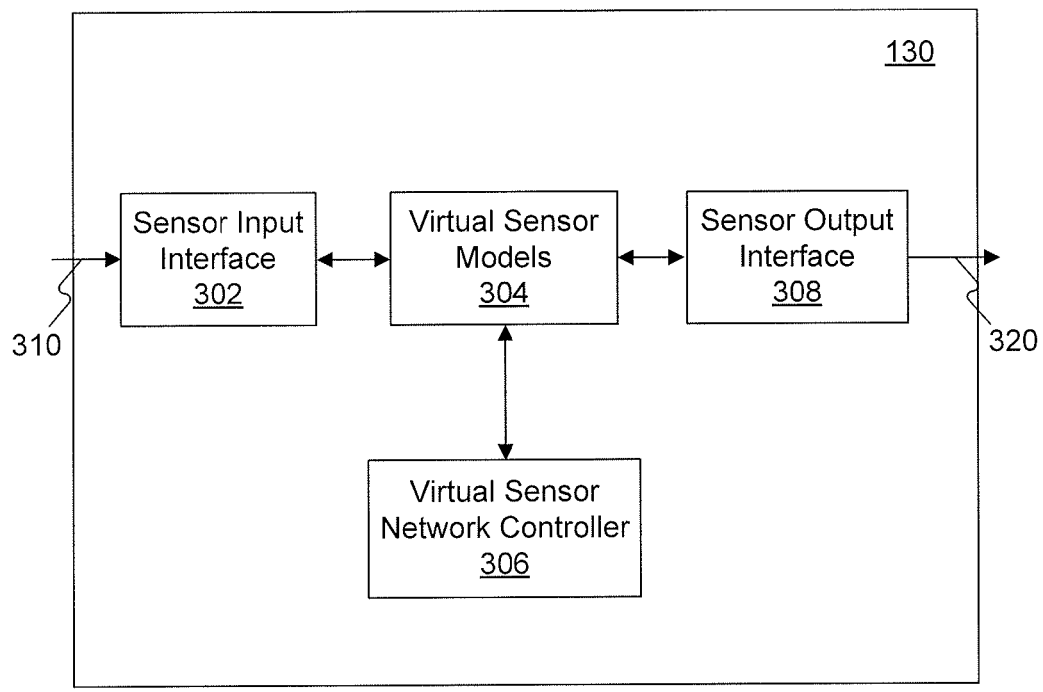
FIG. 3A is a block diagram of an exemplary virtual sensor network system that may be incorporated into the machine of FIG. 1.

FIG. 3A shows a functional block diagram of virtual sensor network system 130 consistent with disclosed embodiments. As shown in FIG. 3A, virtual sensor network system 130 may include a sensor input interface 302, virtual sensor models 304, a virtual sensor network controller 306, and a sensor output interface 308. Input parameter values 310 are provided to sensor input interface 302 and output parameter values 320 are provided by sensor output interface 308.

Sensor input interface 302 may include any appropriate interface, such as an I/O interface or a data link configured to obtain information from various physical sensors (e.g., physical sensors 140 and 142) and/or from ECM 120. The information may include values of input or control parameters of the physical sensors, operational status of the physical sensors, and/or values of output parameters of the physical sensors. The information may also include values of input parameters from ECM 120 that may be sent to replace parameter values otherwise received from physical sensors 140 and 142. Further, the information may be provided to sensor input interface 302 as input parameter values 310.

Sensor output interface 308 may include any appropriate interface, such as an I/O interface or a datalink interface (e.g., an ECM/xPC interface), configured to provide information from virtual sensor models 304 and virtual sensor network controller 306 to external systems, such as ECM 120, or to an external user of virtual sensor network system 130, etc. The information may be provided to external systems and/or users as output parameter values 320.

Figure 3B:
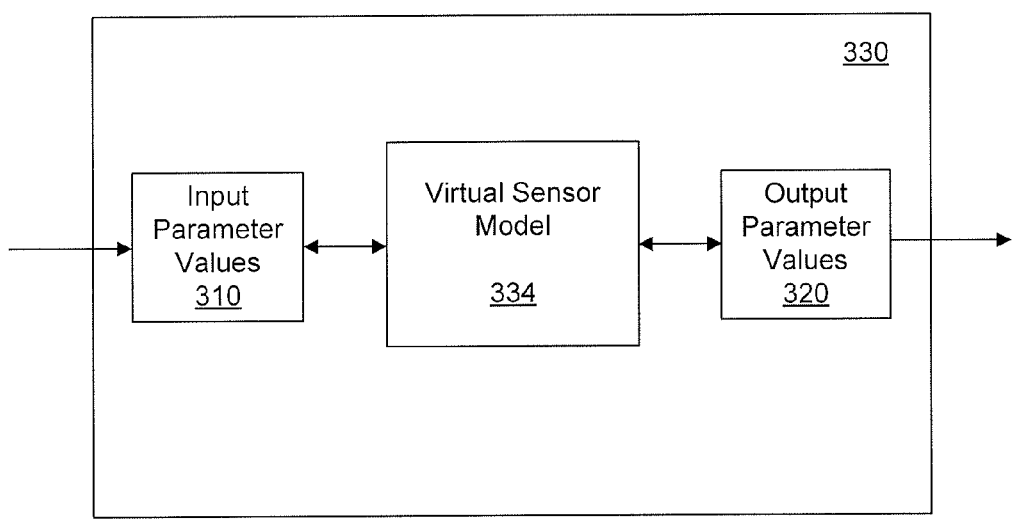
FIG. 3B is a block diagram of an exemplary virtual sensor that may be incorporated into the machine of FIG. 1.

Virtual sensor models 304 may include a plurality of virtual sensors, such as virtual emission sensors, virtual fuel sensors, and virtual speed sensors. Any virtual sensor may be included in virtual sensor models 304. FIG. 3B shows an exemplary virtual sensor 330 consistent with the disclosed embodiments.

As shown in FIG. 3B, virtual sensor 330 may include a virtual sensor model 334, input parameter values 310, and output parameter values 320. Virtual sensor model 334 may be established to link (e.g. build interrelationships) between input parameter values 310 (e.g., measured parameter values) and output parameter values 320 (e.g., sensing parameter values). After virtual sensor model 334 is established, input parameter values 310 may be provided to virtual sensor model 334 to generate output parameter values 320 based on the given input parameter values 310 and the interrelationships between input parameter values 310 and output parameter values 320 established by virtual sensor model 334.

In certain embodiments, virtual sensor 330 may be configured to include a virtual emission sensor to provide levels of substance emitted from an exhaust system (not shown) of engine 110, such as levels of nitrogen oxides ($NO_x$), sulfur dioxide ($SO_2$), carbon monoxide (CO), total reduced sulfur (TRS), soot (i.e., a dark powdery deposit of unburned fuel residues in emission), hydrocarbon (HC), etc. For example, $NO_x$ emission level, soot emission level, and HC emission level may be important to normal operation of engine 110 and/or to meet certain environmental requirements. Other emission levels, however, may also be included.

Input parameter values 310 may include any appropriate type of data associated with NO emission levels. For example, input parameter values 310 may be values of parameters used to control various response characteristics of engine 110 and/or values of parameters associated with conditions corresponding to the operation of engine 110. For example, input parameter values 310 may include values related to fuel injection timing, compression ratios, turbocharger efficiency, aftercooler characteristics, temperature (e.g., intake manifold temperature), pressure (e.g., intake manifold pressure), ambient conditions (e.g., ambient humidity), fuel rates, and engine speeds, etc. Other parameters, however, may also be included. For example, parameters originated from other vehicle systems, such as chosen transmission gear, axle ratio, elevation and/or inclination of the vehicle, etc., may also be included. Further, input parameter values 310 may be measured by certain physical sensors, such as physical sensor 142, and/or created by other control systems such as ECM 120.

Virtual sensor model 334 may include any appropriate type of mathematical or physical model indicating interrelationships between input parameter values 310 and output parameter values 320. For example, virtual sensor model 334 may be a neural network based mathematical model that is trained to capture interrelationships between input parameter values 310 and output parameter values 320. Other types of mathematical models, such as fuzzy logic models, linear system models, and/or non-linear system models, etc., may also be used. Virtual sensor model 334 may be trained and validated using data records collected from a particular engine application for which virtual sensor model 334 is established. That is, virtual sensor model 334 may be established according to particular rules corresponding to a particular type of model using the data records, and the interrelationships of virtual sensor model 334 may be verified by using part of the data records.

After virtual sensor model 334 is trained and validated, virtual sensor model 334 may be optimized to define a desired input space of input parameter values 310 and/or a desired distribution of output parameter values 320. The validated or optimized virtual sensor model 334 may be used to produce corresponding values of output parameter values 320 when provided with a set of values of input parameter values 310. In the above example, virtual sensor model 334 may be used to produce $NO_x$ emission level based on measured parameters, such as ambient humidity, intake manifold pressure, intake manifold temperature, fuel rate, and engine speed, etc.

In some embodiments, the data records used to train, validate, and optimize virtual sensor model 334 may include information regarding rates of change of input parameter values 310 and/or output parameter values 320, such as input parameter value default rates of change, input parameter value threshold rates of change, output parameter value default rates of change, and output parameter value threshold rates of change, for various physical sensors and environments (e.g., different engine types, etc.). In other embodiments, the data records may include information from which the default and threshold rates of change may be derived and incorporated into virtual sensor model 334. This is described in greater detail below with regard to FIG. 4.

The establishment and operations of virtual sensor model 334 may be carried out by processor 202 based on computer programs stored at or loaded to virtual sensor network system 130. Alternatively, the establishment of virtual sensor model 334 may be realized by other computer systems, such as ECM 120 or a separate general purpose computer configured to create process models. The created process model may then be loaded to virtual sensor network system 130 for operations. For example, processor 202 may perform a virtual sensor process model generation and optimization process to generate and optimize virtual sensor model 334. FIG. 4 shows an exemplary model generation and optimization process that may be performed by processor 202.

Figure 4:
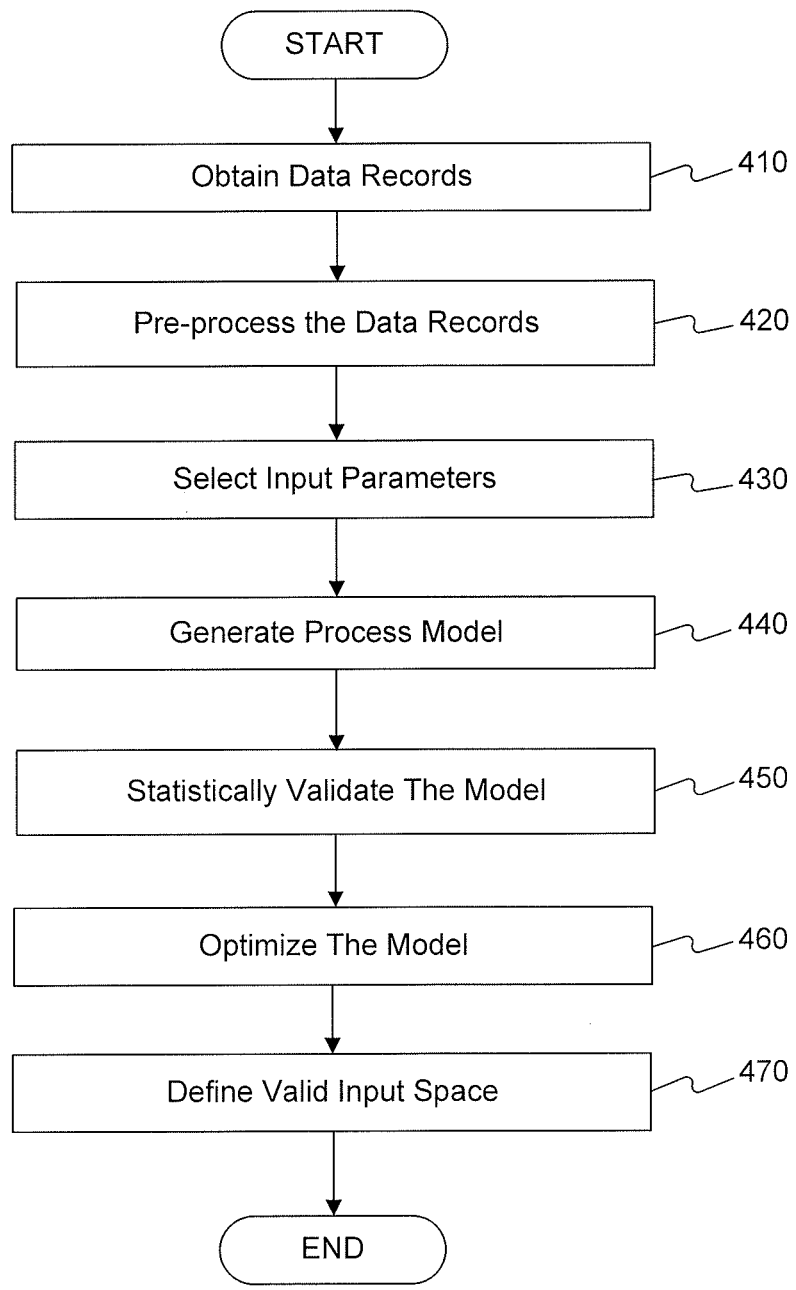
FIG. 4 is a flow chart illustrating an exemplary model generation and optimization process.

As shown in FIG. 4, at the beginning of the model generation and optimization process, processor 202 may obtain data records associated with input parameter values 310 and output parameter values 320 (step 410). The data records may include information characterizing engine operations and emission levels including $NO_x$ emission levels. Physical sensor 140, e.g., a physical $NO_x$ emission sensor, may be provided to generate data records regarding output parameter values 320 (e.g., sensing parameters, such as $NO_x$ levels). ECM 120 and/or physical sensor 142 may provide data records regarding input parameter values 310 (e.g., measured parameters, such as intake manifold temperature, intake manifold pressure, ambient humidity, fuel rates, and engine speeds, etc.).

Further, the data records may include both input parameter values and output parameter values and may be collected based on various engines or based on a single test engine, under various predetermined operational conditions. The data records may also be collected from experiments designed for collecting such data. Alternatively, the data records may be generated artificially by other related processes, such as other emission modeling, simulation, or analysis processes. The data records may also include training data used to build virtual sensor model 334 and testing data used to validate virtual sensor model 334. In addition, the data records may also include simulation data used to observe and optimize virtual sensor model 334.

The data records may reflect characteristics of input parameter values 310 and output parameter values 320, such as statistical distributions, normal ranges, and/or precision tolerances, etc. The data records may also reflect other characteristics such as statistical analysis of the rates of change of input parameter values 310 and output parameter values 320. For example, the data records may include maximum rates of change of one or more input parameter values 310 and/or output parameter values 320. Further, the data records may include statistical distributions, normal ranges, weighted moving average value calculations, and/or any other type of statistical analysis known to one of skill in the art, of the rates of change of input parameter values 310 and/or output parameter values 320. This information may likewise be generated by experimental testing, modeling and simulations processes, or by any other method known to one of skill in the art.

The data records may also include information characterizing capabilities of one or more physical sensors, such as physical sensors 140 and 142. For example, the data records may include information regarding the physical sensor's technical specifications, such as minimum and maximum detectable parameter values, measurement frequency, a maximum rate of change at which the physical sensor can accurately detect a measured parameter value, etc. Using a temperature sensor as an example, the data records may include a minimum rated temperature of −50° C. and a maximum rated temperature of +350° C. and may specify that the temperature sensor can make measurements with a frequency of 100 measurements per second with a maximum detectable time-rate of change of the temperature being 100° C. per second.

Once the data records are obtained (step 410), processor 202 may pre-process the data records to clean up the data records for obvious errors and to eliminate redundancies (step 420). Processor 202 may remove approximately identical data records and/or remove data records that are out of a reasonable range in order to be meaningful for model generation and optimization. After the data records have been pre-processed, processor 202 may select proper input parameters by analyzing the data records (step 430).

The data records may be associated with many input variables, such as variables corresponding to fuel injection timing, compression ratios, turbocharger efficiency, aftercooler characteristics, various temperature parameters, various pressure parameters, various ambient conditions, fuel rates, and engine speeds, etc. The number of input variables may be greater than the number of a particular set of input parameters used for virtual sensor model 334. That is, the input parameters may be a subset of the input variables. For example, the input parameters may include intake manifold temperature, intake manifold pressure, ambient humidity, fuel rate, and engine speed, etc., of the input variables.

Processor 202 may select the input parameters from the input variables according to predetermined criteria. For example, processor 202 may choose the input parameters by experimentation and/or expert opinions. Alternatively, in certain embodiments, processor 202 may select input parameters based on a Mahalanobis distance between a normal data set and an abnormal data set of the data records. The normal data set and abnormal data set may be defined by processor 202 using any appropriate method. For example, the normal data set may include characteristic data associated with input parameters that produce desired output parameters. On the other hand, the abnormal data set may include characteristic data that may be out of tolerance or may need to be avoided. The normal data set and abnormal data set may be predefined by processor 202.

Mahalanobis distance may refer to a mathematical representation that may be used to measure data profiles based on correlations between parameters in a data set. Mahalanobis distance differs from Euclidean distance in that Mahalanobis distance takes into account the correlations of the data set. Mahalanobis distance of a data set X (e.g., a multivariate vector) may be represented as:

$$MD_i = (X_i - \mu_x)\Sigma^{-1}(X_i - \mu_x)' \tag{1}$$

where $\mu_x$ is the mean of X and $\Sigma^{-1}$ is an inverse variance-covariance matrix of X. $MD_i$ weights the distance of a data point $X_i$ from its mean $\mu_x$ such that data samples or data points that are on the same multivariate normal density contour will have the same distance. Such data samples or data points may be used to identify and select correlated parameters from separate data groups having different variances.

Processor 202 may select input parameters as a desired subset of input variables such that the Mahalanobis distance between the normal data set and the abnormal data set is maximized or optimized. A genetic algorithm may be used by processor 202 to search input variables for the desired subset with the purpose of maximizing the Mahalanobis distance. Processor 202 may select a candidate subset of the input variables based on a predetermined criteria and calculate a Mahalanobis distance $MD_{normal}$ of the normal data set and a Mahalanobis distance $MD_{abnormal}$ of the abnormal data set. Processor 202 may also calculate the Mahalanobis distance between the normal data set and the abnormal data (i.e., the deviation of the Mahalanobis distance $MD_x = MD_{normal} - MD_{abnormal}$). Other types of deviations, however, may also be used.

After selecting the input parameters (e.g., intake manifold temperature, intake manifold pressure, ambient humidity, fuel rate, engine speed, etc.), processor 202 may generate virtual sensor model 334 to build interrelationships between the input parameters and output parameters (step 440). In certain embodiments, virtual sensor model 334 may correspond to a computational model, such as, for example, a computational model built on any appropriate type of neural network. The type of neural network computational model that may be used may include back propagation, feed forward models, cascaded neural networks, and/or hybrid neural networks, etc. Particular types or structures of the neural network used may depend on particular applications. Other types of computational models, such as linear system or non-linear system models, etc., may also be used.

The neural network computational model (i.e., virtual sensor model 334) may be trained by using selected data records. For example, the neural network computational model may include a relationship between output parameters (e.g., $NO_x$ emission level, etc.) and input parameters (e.g., intake manifold temperature, intake manifold pressure, ambient humidity, fuel rate, and engine speed, etc.).

The neural network computational model may be evaluated by predetermined criteria to determine whether the training is completed. The criteria may include desired ranges of accuracy, time, and/or number of training iterations, etc.

After the neural network has been trained (i.e., the computational model has initially been established based on the predetermined criteria), processor 202 may statistically validate the computational model (step 450). Statistical validation may refer to an analyzing process to compare outputs of the neural network computational model with actual or expected outputs to determine the accuracy of the computational model. Part of the data records may be reserved for use in the validation process.

Alternatively, processor 202 may also generate simulation or validation data for use in the validation process. This may be performed either independently of a validation sample or in conjunction with the sample. Statistical distributions of inputs may be determined from the data records used for modeling. A statistical simulation, such as Latin Hypercube simulation, may be used to generate hypothetical input data records. These input data records are processed by the computational model, resulting in one or more distributions of output characteristics. The distributions of the output characteristics from the computational model may be compared to distributions of output characteristics observed in a population. Statistical quality tests may be performed on the output distributions of the computational model and the observed output distributions to ensure model integrity.

Once trained and validated, virtual sensor model 334 may be used to predict values of the output parameters (e.g. output parameter values 320) when provided with values of the input parameters (e.g. input parameter values 310). Further, processor 202 may optimize virtual sensor model 334 by determining desired distributions of input parameter values 310 based on relationships between input parameter values 310 and desired distributions of output parameter values 320 (step 460). Part of the data records may likewise be reserved for use in the validation processes.

Processor 202 may analyze the relationships between desired distributions of input parameter values 310 and desired distributions of output parameter values 320 based on particular applications. For example, processor 202 may select desired ranges for output parameter values 320 (e.g., $NO_x$ emission level that is desired or within certain predetermined range). Processor 202 may then run a simulation of the computational model to find a desired statistical distribution for an individual input parameter (e.g., one of intake manifold temperature, intake manifold pressure, ambient humidity, fuel rate, and engine speed, etc.). That is, processor 202 may separately determine a distribution (e.g., mean, standard variation, etc.) of the individual input parameter values 310 corresponding to the normal ranges of output parameter values 320. After determining respective distributions for all individual input parameters values 310, processor 202 may combine the desired distributions for all the individual input parameters to determine desired distributions and characteristics for overall input parameter values 310.

In some embodiments, virtual sensor model 334 may be optimized using data records that include information regarding the time rates of change of one or more input parameter values 310 and/or output parameter values 320. For example, processor 202 may analyze one or more data records to determine a maximum allowable rate of change for a certain input parameter value 310 (e.g., an input parameter value threshold rate of change). Likewise, processor 202 may analyze one or more data records to determine a maximum allowable rate of change for a certain output parameter value 320 (e.g., an output parameter value threshold rate of change).

The input and output parameter value threshold rates of change may be established by processor 202 in a variety of different ways. In some embodiments, the input and output parameter value threshold rates of change may be determined based on physical sensor characteristics. For example, the input parameter value threshold rates of change may be determined based on actual rate of change constraints associated with physical sensors, which may be listed in technical specifications of the physical sensors. In this case, the input parameter value threshold rate of change may be determined to be the maximum rate of change of the physical sensor, such as physical sensor 142, or some percentage thereof, e.g., 90%, 110%, or any other percentage. Similarly, the output parameter value threshold rates of change may also be determined based on actual rate of change constraints for physical sensors. For example, if virtual sensor model 334 is being used as an intelligent failover design for physical sensor 140, the output parameter value threshold rate of change may be set to a rate of change of physical sensor 140.

In other embodiments, the input and output parameter value threshold rates of change may be determined based on testing or training data in the data records. For example the data records may include data from actual tests and/or simulations that provide multiple data points for various input parameter values 310 and/or output parameter values 320. In these embodiments, the input and output parameter value threshold rates of change may be determined to be the maximum rate of change of the corresponding parameter values in the data records, or may be some percentage thereof, e.g., 90%, 110%, or any other percentage. Further, the input and output parameter value threshold rates of change may be determined based on any other method known to those skilled in the art, e.g., input from a human operator, mathematical calculations based on any combination of sensor characteristics, environmental constraints, testing data, etc.

In some embodiments, virtual sensor model 334 may also be optimized by determining default rates of change that may be used to replace input parameter values 310 and/or output parameter values 320 when input parameter values 310 and/or output parameter values 320 exceed the input or output parameter value threshold rates of change. The default rates of change may be determined according to the same processes described above with regard to determining the threshold rates of change and/or by any other process known to one of skill in the art. Further, in one embodiment the default rate of change for a particular parameter may be the same as the threshold rate of change for that parameter. However, in other embodiments, the default rate of change may differ from the threshold rate of change. For example, the default rate of change may be determined to be 95%, 105%, etc., of the threshold rate of change.

Thus, in some embodiments, virtual sensor model 334 may modify a received input parameter value 310 or calculated output parameter value 320 based on whether a rate of change of the input parameter value 310 or output parameter value 320 exceeds the threshold value rate of change discussed above. For example, in some embodiments, virtual sensor model 334 may replace input parameter value 310 with an input parameter value that is calculated based on the input parameter value default rate of change when the rate of change of input parameter value 310 exceeds the input parameter value threshold rate of change. Consider the following non-limiting, simplified, example: assume that the input parameter value threshold rate of change for a temperature sensor is ±100° C./second and assume that the input parameter value default rate of change for the temperature sensor is ±95° C./second. Now, assume that input parameter values 310 are received from the temperature sensor in one second intervals as: 85° C., 95° C., and 210° C. for a three second period. In this example, virtual sensor model 334 may determine that the 105° C./second difference between the last two values exceeds the ±100° C./second input parameter value threshold value rate of change. Thus, instead of using 210° C. as the third parameter value, virtual sensor model 334 may constrain the third parameter value to be within the default rate of change, e.g., virtual sensor model 334 may change the third input parameter value to 205° C.

In the example above, the rate of change of the input parameter values is calculated as a difference between a subsequent output parameter value and a preceding output parameter value divided by the time between measurements of the subsequent output parameter value and the preceding output parameter value. However, one of skill in the art will appreciate that the threshold and default rates of change are not limited merely to time-based derivative calculations, and may be calculated in a variety of different ways. For example, the rates of change may be calculated as the first, second, third, etc., derivatives of the input or output parameter values with respect to time, value differences with respect to time that are averaged across two or more data points, the moving average of the input or output parameter values with respect to time, the weighted moving average of the input or output parameter values with respect to time, and/or any other analytical approach known to one of skill in the art.

Further, the rate of change of the input and output parameter values are not limited to a time-based rate of change. For example, in some embodiments, the rate of change of one input and/or output parameter value may be measured based on the rate of change of another, e.g., measuring a change of temperature (e.g., intake manifold temperature) based on a change of pressure (e.g., intake manifold pressure). In these embodiments, an input parameter value threshold rate of change and/or an output parameter value threshold rate of change may be non-time-based.

Moreover, the use of data records including information regarding the rates of change of input parameter values 310 and/or output parameter values 320 is not limited to use in the optimization step (step 460), and may alternatively or additionally be used in other steps in the process described in FIG. 4, such as the input parameter selection step (step 430), the process model generation step (step 440), the validation step (step 450), etc. For example, information regarding the rates of change of input parameter values 310 and output parameter values 320, including threshold and default rates of change may be used to develop and train virtual sensor model 334.

Once the desired distributions and rate of change constraints for the input and output parameters are determined, processor 202 may define a valid input space for virtual sensor model 334 that may include any input parameter within the desired distributions (step 470).

After virtual sensor model 334 is trained, validated, optimized, and/or selected, ECM 120 and virtual sensor network system 130 may provide control functions to relevant components of machine 100. For example, ECM 120 may control engine 110 according to the $NO_x$ emission level provided by virtual sensor network system 130, and, in particular, by virtual sensor model 334. In certain embodiments, virtual sensor network system 130 may be used to replace corresponding physical sensors. For example, virtual sensor network system 130 may replace one or more $NO_x$ emission sensors used by ECM 120. On the other hand, virtual sensor network system 130 may be used to provide intelligent failover for one or more $NO_x$ emission sensors, so that if the physical mission sensor fails or experiences an error, virtual sensor network system 130 may ensure uninterrupted emissions detection.

In some embodiments, information regarding the rates of change of input parameter values 310 and output parameter values 320 (e.g., input parameter value default rates of change, input parameter threshold rates of change, output parameter value default rates of change, output parameter value threshold rates of change, etc.) may be incorporated into a control algorithm for ECM 120. That is, virtual sensor network system 130 may map input parameter values 310 to output parameter values 320 without taking into account threshold and default rates of change. In these embodiments, ECM 120 may instead determine threshold and default rates of change as discussed above with respect to step 460. Then, ECM 120 may monitor and constrain input parameter values 310 before they are received by virtual sensor network system 130 and may monitor and constrain output parameter values 320 received from virtual sensor network system 130 before ECM 120 uses output parameter values 320 to control engine 110. This is discussed in greater detail below with regard to FIG. 6.

Industrial Applicability

The disclosed virtual sensor system may be applicable to any virtual sensor based system used to monitor and/or control a machine. In particular, the virtual sensor system may be applicable to a virtual sensor based control system for controlling an engine and monitoring emissions from the engine. Constraining a time rate of change of one or more input parameters values and/or output parameters values of the virtual sensor system results in more predictable and realistic parameter values used for monitoring the engine and thus better control over the engine.

Figure 5:
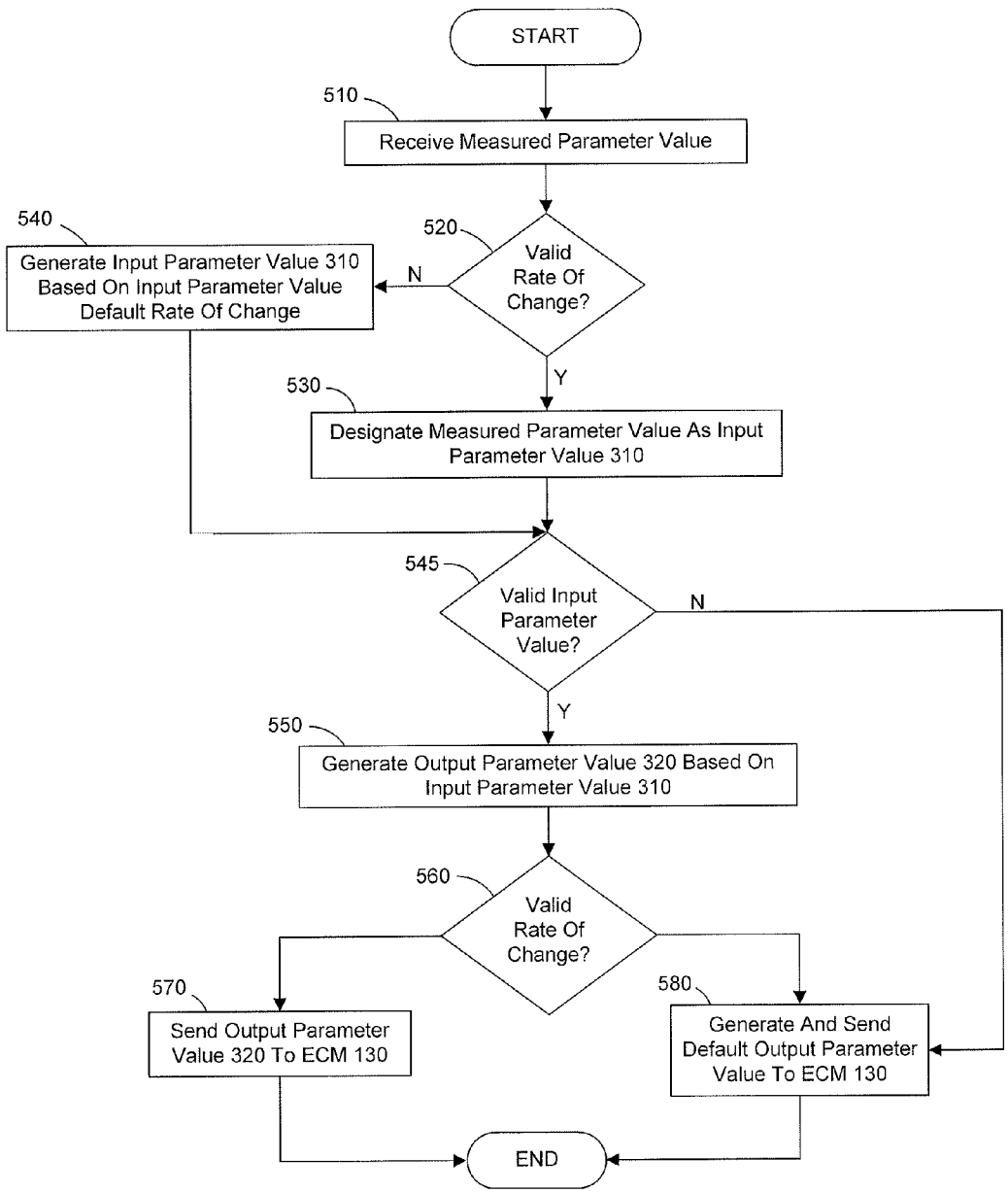
FIG. 5 is a flow chart illustrating an exemplary process that may be performed by a virtual sensor system.

FIG. 5 shows an exemplary process that may be performed by virtual sensor network system 130 to provide data to ECM 120 that ECM 120 may use to control engine 110. As shown in FIG. 5, virtual sensor network system 130 may receive one or more measured parameter values such as values related to intake manifold temperature, intake manifold pressure, ambient humidity, fuel rate, and engine speed, etc., from physical sensors 140 and 142, from ECM 120, and/or from elsewhere (step 510). In some embodiments, virtual sensor network system 130 may receive the measured parameter values at multiple different moments in time, e.g., creating a time series. After receiving the measured parameter value, virtual sensor network system 130 may determine whether a rate of change of the measured parameter value is valid (step 520). For example, virtual sensor network system 130 may compare a time rate of change of the measured parameter value to the input parameter value threshold rate of change. Virtual sensor network system 130 may perform such a comparison for one or more of the measured parameters that are received (e.g., for intake manifold temperature, intake manifold pressure, ambient humidity, etc.). As discussed above, the input parameter value threshold rate of change may be determined based on a maximum rate of change of a physical device, and/or by statistical analysis of one or more data records.

If virtual sensor network system 130 determines that the rate of change of the measured parameter value is valid, virtual sensor network system 130 may designate the received measured parameter value as one of input parameter values 310 for virtual sensor model 334 (step 530). If, on the other hand, virtual sensor network system 130 determines that the rate of change of the measured parameter value is not valid, virtual sensor network system 130 may instead generate a replacement input parameter value 310 for virtual sensor model 334 based on the input parameter value default rate of change (step 540). As discussed above, the input parameter value default rate of change may be determined based on a maximum rate of change of a physical device, and/or by statistical analysis of one or more data records.

After input parameter value 310 is designated (step 530) or generated (step 540), virtual sensor network system 130 may determine whether input parameter value 310 is valid (step 545). For example, virtual sensor network system 130 may compare input parameter value 310 to the valid input space for virtual sensor model 334 that may be defined as described above with regard to FIG. 4. If input parameter value 310 is outside of the distributions included in the valid input space for virtual sensor model 334, virtual sensor network system 130 may generate a default output parameter value based on the output parameter value default rate of change to ECM 120 and send the default output parameter value to ECM 120 (step 580).

If, on the other hand, input parameter value 310 is within the distributions included in the valid input space for virtual sensor model 334, virtual sensor network system 130 may generate output parameter value 320 based on input parameter value 310 (step 550). For example, virtual sensor network system 130 may generate output parameter value 320 based on one or more input parameter values 310 and/or and the interrelationships between input parameter values 310 and output parameter values 320 established by virtual sensor model 334. Virtual sensor network system 130 may also determine whether the rate of change of output parameter value 320 is valid (step 560). For example, virtual sensor network system 130 may compare the rate of change of output parameter value 320 to an output parameter value threshold rate of change. If the rate of change of output parameter value 320 exceeds the output parameter value threshold rate of change, virtual sensor network system 130 may determine that the rate of change is not valid. As discussed above, the output parameter threshold rate of change may be determined based on a maximum rate of change of a physical device, by statistical analysis of one or more data records, etc.

If virtual sensor network system 130 determines that the rate of change of output parameter value 320 is valid, virtual sensor network system 130 may send the output parameter value 320 to ECM 120 for use in controlling the machine (570). If, on the other hand, virtual sensor network system 130 determines that the rate of change of output parameter value 320 is not valid, virtual sensor network system 130 may generate a default output parameter value based on the output parameter value default rate of change to ECM 120 and send the default output parameter value to ECM 120 (step 580). When sending the default parameter to ECM 120 as the output parameter, virtual sensor network system 130 may also send a notification to ECM 120 indicating that the value being sent is a default parameter value. This may allow ECM 120, for example, to only accept consecutive default parameter values for a predetermined period of time before taking other measures, e.g., issuing a warning to an operator of machine 100, ceasing operation of machine 100, etc. In other embodiments, virtual sensor network system 130 may stop sending default parameters to ECM 120 after a predetermined period of time.

As discussed above, ECM 120 may perform a control process based on virtual sensor network system 130. Further, ECM 120 may also constrain the rate of change of input parameter values 310 and/or output parameter values 320 in place of or in addition to any rate-shaping capabilities in virtual sensor network system 130. FIG. 6 shows an exemplary control process that may be performed by ECM 120.

Figure 6:
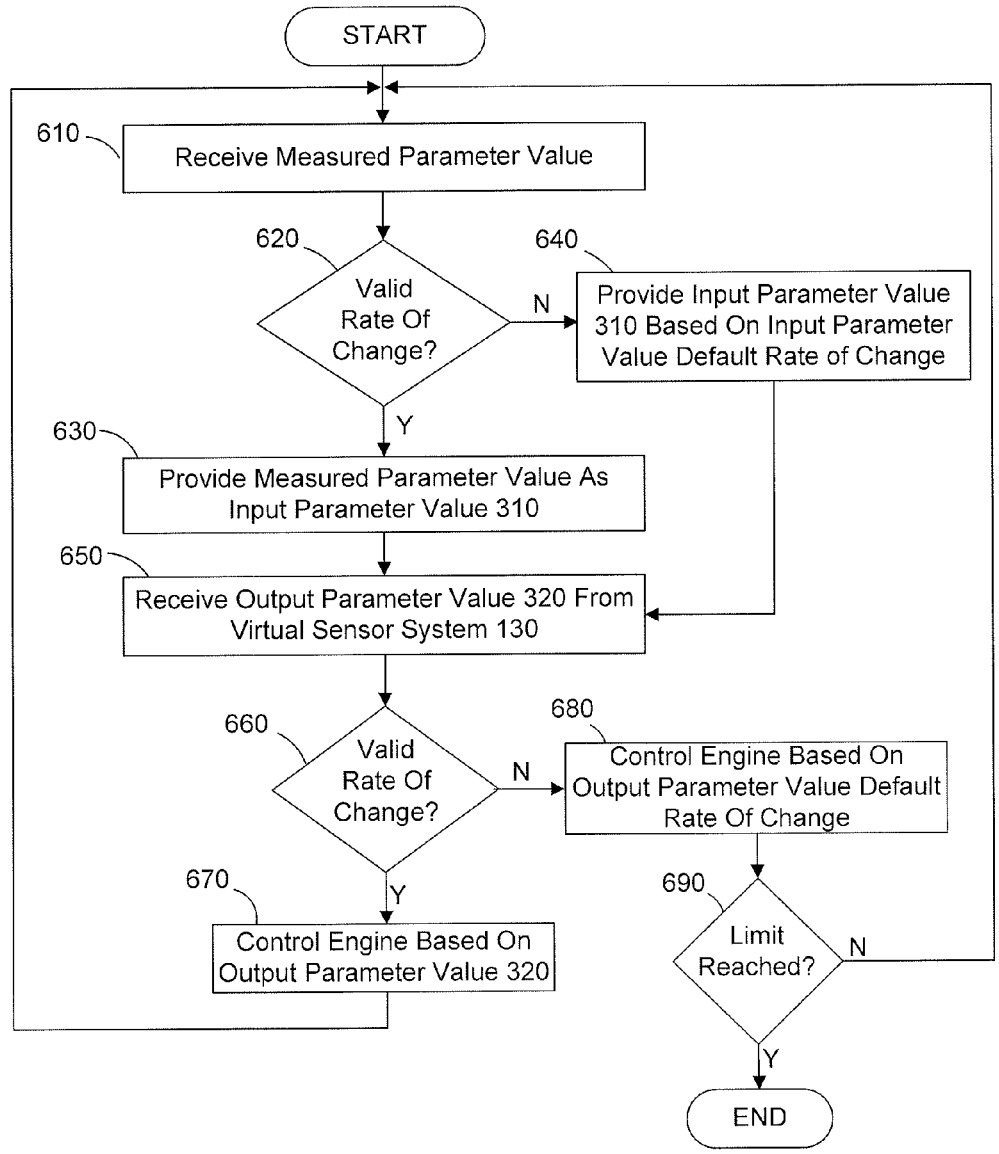
FIG. 6 is a flow chart illustrating an exemplary process that may be performed by an electronic control module.

As shown in FIG. 6, ECM 120 may control and/or facilitate physical sensors 140 and/or 142 and engine 110 to measure relevant parameters, such as intake manifold temperature, intake manifold pressure, ambient humidity, fuel rate, and engine speed, etc. and may receive one or more measured parameter values (step 610). ECM 120 may then determine whether a rate of change of the parameter value is valid (step 620). For example, ECM 120 may compare a time rate of change of the measured parameter value to the input parameter value threshold rate of change. ECM 120 may perform such a comparison for one or more of the parameters that are being measured (e.g., for intake manifold temperature, intake manifold pressure, ambient humidity, etc.). As discussed above, the input parameter value threshold rate of change may be determined based on a maximum rate of change of a physical device, by statistical analysis of one or more data records, etc.

If ECM 120 determines that the rate of change of the measured parameter value is valid, ECM 120 may provide the measured parameter value as input parameter value 310 to virtual sensor network system 130 (step 630). If, on the other hand, ECM 120 determines that the rate of change of the measured parameter value is not valid, ECM 120 may provide a replacement input parameter value based on the input parameter value default rate of change to virtual sensor network system 130 as input parameter value 310 (step 640). As discussed above, the input parameter value default rate of change may be determined based on a maximum rate of change of a physical device, by statistical analysis of one or more data records, etc.

ECM 120 may receive output parameter value 320 based on input parameter value 310 (step 650). For example, virtual sensor network system 130 may generate output parameter value 320 based on one or more input parameter values 310 and/or the interrelationships established by virtual sensor model 334 and may send output parameter 320 to ECM 120. ECM 120 may determine whether the rate of change of output parameter value 320 is valid (step 660). For example, ECM 120 may compare the rate of change of output parameter value 320 to the output parameter value threshold rate of change. If the rate of change of output parameter value 320 exceeds the output parameter value threshold rate of change, ECM 120 may determine that the rate of change is not valid. As discussed above, the output parameter value threshold rate of change may be determined based on a maximum rate of change of a physical device, by statistical analysis of one or more data records, etc.

If ECM 120 determines that the rate of change of output parameter value 320 is valid, ECM 120 may control engine 110 based on output parameter value 320 (step 670). If, on the other hand, ECM 120 determines that the rate of change of output parameter value 320 is not valid, ECM 120 may control engine 110 based on the output parameter value default rate of change (step 680).

If ECM 120 controls engine 110 based on the output parameter value default rate of change, ECM 120 may determine whether a limit has been reached for controlling engine 110 based on the output parameter value default rate of change (step 690). For example, ECM 120 may include a time limit or command limit over which it will no longer issued commands based on an output parameter value default rate of change. In one embodiment, ECM 120 may send an error message to an operator of machine 100 and/or cease control of engine 110 if it has been controlling engine 110 based on an output parameter value default rate of change for the last 120 seconds.

The disclosed virtual sensor based system may help improve engine control. In particular, by constraining a time rate of change of one or more input and/or output parameter values of virtual sensor network system 130, output parameters of virtual sensor network system 130 can be made more stable. As a result, ECM 120 may more stably control physical devices such as engine 110, resulting in more efficient operation of engine 110.

It will be apparent to those skilled in the art that various modifications and variations can be made to the disclosed virtual sensor system. Other embodiments will be apparent to those skilled in the art from consideration of the specification and practice of the disclosed virtual sensor system. It is intended that the specification and examples be considered as exemplary only, with a true scope being indicated by the following claims and their equivalents.

What is claimed is:

1. A virtual sensor network system comprising:
 a memory configured to:
  store a virtual sensor model, an output parameter value default rate of change, an output parameter value threshold rate of change, an input parameter value default rate of change, and an input parameter value threshold rate of change; and
 a processor configured to:
  receive in real time, as input parameter values, physical parameter values of a machine measured from a physical sensor;
  compare a rate of change of the input parameter values to the input parameter value threshold rate of change;
  replace at least one of the input parameter values with a parameter value calculated based on the input parameter value default rate of change before generating the output parameter values if the rate of change of the input parameter values exceeds the input parameter value threshold rate of change,
  generate output parameter values based on the input parameter values and the virtual sensor model;
  make a comparison between a rate of change of the output parameter values to the output parameter value threshold rate of change;
  generate a default output parameter value based on the output parameter value default rate of change if the rate of change of the output parameter values exceeds the output parameter value threshold rate of change; and
  send the default output parameter value to an electronic control module for the machine if the rate of change of the output parameter values exceeds the output parameter value threshold rate of change.

2. The virtual sensor network system of claim 1, wherein the processor is further configured to calculate the rate of change of the output parameter values as a difference between a subsequent output parameter value and a preceding output parameter value divided by the time between measurements of the subsequent output parameter value and the preceding output parameter value.

3. The virtual sensor network system of claim 1, wherein the output parameter value threshold rate of change stored in the memory is determined based on a statistical analysis of data records including test data of the machine.

4. The virtual sensor network system of claim 1, wherein:
 the virtual sensor model stored in the memory models an output from modeled physical sensor, and
 the output parameter value threshold rate of change stored in the memory is determined based on technical specifications of the modeled physical sensor.

5. A computer-implemented virtual sensor control method comprising:
 receiving in real time, as input parameter values, physical parameter values of a machine measured from a physical sensor;
 generating output parameter values based on the input parameter values and a virtual sensor model;
 controlling the machine based on a comparison of a rate of change of the output parameter values to an output parameter value threshold rate of change;
 comparing a rate of change of the input parameter values to an input parameter value threshold rate of change;
 replacing at least one of the input parameter values with a parameter value calculated based on an input parameter value default rate of change before generating the output parameter values if the rate of change of the input parameter values exceeds the input parameter value threshold rate of change; and
 generating an output parameter value default rate of change if the rate of change of the output parameter values exceeds the output parameter value threshold rate of change; and
 controlling the machine based on the output parameter value default rate of change.

6. The computer-implemented virtual sensor control method of claim 5, further including:
 determining whether the input parameter values are valid by comparing the input parameter values to a valid input space of the virtual sensor model; and controlling the machine based on at least one of the output parameter values if one or more of the input parameter values are invalid.

7. A computer-implemented virtual sensor control method of claim 5, further including calculating the rate of change of the output parameter values as a difference between a subsequent output parameter value and a preceding output parameter value divided by the time between measurements of the subsequent output parameter value and the preceding output parameter value.

8. A computer-implemented virtual sensor control method of claim 5, further including calculating the rate of change of the output parameter values as a weighted moving average of two or more of the output parameter values.

9. A computer-implemented virtual sensor control method of claim 5, further including calculating the rate of change of the output parameter values as a second derivative with respect to time of the output parameter values.

10. A computer-implemented virtual sensor control method claim 5, further including calculating the output parameter value default rate of change and the output parameter value threshold rate of change based on one or more data records that include test data of the machine.

11. A control system comprising:
 a physical sensor configured to measure physical parameter values of a machine at a plurality of times;
 a virtual sensor network system configured to:
  receive in real time the physical parameter values measured by the physical sensor as input parameter values; and
  generate output parameter values based on the input parameter values; and
 an electronic control module configured to:
  store an input parameter value default rate of change, an input parameter value threshold rate of change, an output parameter value default rate of change, and an output parameter value threshold rate of change;
  compare a rate of change of the input parameter values to the input parameter value threshold rate of change;
  replace at least one of the input parameter values with a replacement input parameter value calculated based on the input parameter value default rate of change if the rate of change of the input parameter values exceeds the input parameter value threshold rate of change;
  compare a rate of change of the output parameter values generated by the virtual sensor network system to the output parameter value threshold rate of change; and
  control the machine based on the output parameter value default rate of change if the rate of change of the output parameter values exceeds the output parameter value threshold rate of change,
 wherein the virtual sensor network system further configured to:
  receive the replacement input parameter value from the electronic control module; and
  generate the output parameter values based on the replacement input parameter values.

12. The control system of claim 11, wherein the electronic control module is further configured to calculate the rate of change of the output parameter values as a difference between a subsequent output parameter value and a preceding output parameter value divided by the time between measurements of the subsequent output parameter value and the preceding output parameter value.

13. The control system of claim 11, wherein the electronic control module is further configured to calculate the rate of change of the output parameter values as a weighted moving average of two or more of the output parameter values.

14. The control system of claim 11, wherein the output parameter value default rate of change and the output parameter value threshold rate of change stored in the electronic control module are calculated based on test data of the machine.

15. The control system of claim 11, wherein
 the virtual sensor network system models an output from a modeled physical sensor, and
 the output parameter value default rate of change and the output parameter value threshold rate of change stored in the electronic control module are calculated based on a maximum rate of change of the modeled physical sensor.

* * * * *